(12) United States Patent
Iraschko

(10) Patent No.: US 8,397,884 B2
(45) Date of Patent: *Mar. 19, 2013

(54) COMPACT COMBINED CYLINDER COMPRISING A MANUAL RELEASE DEVICE

(75) Inventor: Johann Iraschko, Schweitenkirchen (DE)

(73) Assignee: Knorr-Bremse System fuer Nutzfahrzeuge GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,080

(22) Filed: Sep. 25, 2009

(65) Prior Publication Data

US 2010/0084229 A1   Apr. 8, 2010

Related U.S. Application Data

(63) Continuation of application No. PCT/EP2008/002363, filed on Mar. 26, 2008.

(30) Foreign Application Priority Data

Mar. 27, 2007   (DE) .................... 10 2007 015 208

(51) Int. Cl.
*F16D 65/22* (2006.01)
*B60T 13/04* (2006.01)

(52) U.S. Cl. ............. 188/170; 188/106 F; 188/265; 303/89; 92/130 R

(58) Field of Classification Search .......... 303/89; 188/166, 170, 106 F, 265; 92/63, 130 A, 92/130 R, 134
See application file for complete search history.

(56) References Cited

U.S. PATENT DOCUMENTS

| | | | |
|---|---|---|---|
| 3,636,822 A | | 1/1972 | Horowitz |
| 3,717,072 A | * | 2/1973 | Kaltenthaler et al. .......... 92/152 |
| 5,377,579 A | * | 1/1995 | Pierce ............................. 92/63 |
| 5,402,866 A | * | 4/1995 | Naedler et al. ................ 188/265 |

(Continued)

FOREIGN PATENT DOCUMENTS

| | | |
|---|---|---|
| DE | 2005 044 708 A1 | 4/2006 |
| WO | WO-9626854 A1 * | 9/1996 |
| WO | WO 97/07322 A1 | 2/1997 |

OTHER PUBLICATIONS

International Search Report dated Sep. 10, 2008 with English translation (four (4) pages).
German office Action dated Jan. 10, 2008 with English translation (eight (8) pages).

*Primary Examiner* — Melody Burch
(74) *Attorney, Agent, or Firm* — Crowell & Moring LLP

(57) ABSTRACT

A brake cylinder for pneumatically actuated vehicle brakes, especially for commercial vehicles, includes a housing. The housing is divided into two chambers by a piston, one of the chambers being used as a pressure chamber for actuating an operating brake section, and a cylinder spring of a spring-loaded brake section being arranged in the other chamber on the opposite side of the piston. The cylinder spring acts on another spring-loaded piston in the chamber, which can be blocked in relation to the first piston by a pneumatically actuated locking mechanism. The other spring-loaded piston is released from the first piston by a releasing action of the blocking mechanism, and is connected to a piston rod for actuating the vehicle brake. Following release of the blocking mechanism, the cylinder spring acts between the two pistons and moves them in relation to each other during a parking braking operation. The brake cylinder includes a manually actuatable release device, in addition to the pneumatically actuable blocking mechanism, for manually releasing the spring-loaded brake section without impairing the function of the operating brake section.

16 Claims, 6 Drawing Sheets

U.S. PATENT DOCUMENTS

| | | | |
|---|---|---|---|
| 7,523,999 B2 | 4/2009 | Iraschko | |
| 2005/0179315 A1* | 8/2005 | Severinsson | 303/89 |
| 2010/0051396 A1* | 3/2010 | Iraschko | 188/170 |
| 2010/0075805 A1* | 3/2010 | Iraschko | 477/182 |
| 2010/0078271 A1* | 4/2010 | Iraschko | 188/106 F |
| 2010/0084228 A1* | 4/2010 | Iraschko | 188/106 F |

* cited by examiner

COMPACT COMBINED CYLINDER COMPRISING A MANUAL RELEASE DEVICE

CROSS-REFERENCE TO RELATED APPLICATIONS

This application is a continuation of PCT International Application No. PCT/EP2008/002363, filed Mar. 26, 2008, which claims priority under 35 U.S.C. §119 to German Patent Application No. DE 10 2007 015 208.8, filed Mar. 27, 2007, the entire disclosures of which are herein expressly incorporated by reference.

This application contains subject matter related to U.S. application Ser. No. 12/566,991, entitled "Brake Cylinder for a Pneumatically Operable Vehicle Brake;" U.S. application Ser. No. 12/567,098, entitled "Compact Combination Cylinder for Vehicle Brakes, Comprising a Control Device, and Method for Controlling the Brake Cylinder;" U.S. application Ser. No. 12/566,980, entitled "Compact Combined Cylinder Comprising a Manual Release Device;" U.S. application Ser. No. 12/567,043, entitled "Compact Combination Brake Cylinder Comprising a Pneumatic Locking Mechanism" and U.S. application Ser. No. 12/567,085, entitled "Compact Combined Brake Cylinder," all filed on even date herewith.

BACKGROUND AND SUMMARY OF THE INVENTION

The invention relates to a brake cylinder for pneumatically actuated vehicle brakes, in particular for commercial vehicles.

In heavy commercial vehicles, the parking brake is actuated by what are known as spring force accumulator cylinders (spring-loaded cylinders). Here, the brake actuating force is generated via spring force, with the result that the requirements for a mechanically actuated parking brake are satisfied.

Since the spring force accumulator cylinders are, as a rule, designed to generate very high forces, manual release in the operating case is no longer appropriate. In the case of pneumatically actuated brakes, the parking brake is therefore released by means of compressed air.

In order to make this possible, spring force accumulator cylinders are, as a rule, equipped with a release piston. It is possible by way of this piston, if compressed air is introduced, to compress the spring to such an extent that the brake is released. In order that the parking brake is not engaged while driving, the piston is loaded constantly with compressed air, with the result that the spring cannot be relieved and therefore the parking brake does not start to act.

The most common design is what is known as a combined cylinder. A combined cylinder includes or combines two different brake cylinder types, namely a spring force accumulator cylinder for the parking brake system (PBS) and a compressed air cylinder (usually a diaphragm cylinder) for the service brake system (SBS).

The two cylinders are usually arranged behind one another in an axial direction. The spring force accumulator part, which acts with its piston rod on the piston collar of the diaphragm cylinder and by the latter, in turn, on the brake lever, is arranged behind the diaphragm part of the combined cylinder.

This design requires a relatively large amount of installation space. However, the installation space is being limited increasingly by the introduction of more complex chassis systems, such as independent suspension systems, lightweight axles, etc.

There are therefore efforts to minimize the space requirement for the parking brake cylinder by other designs and methods of operation. To this extent, what is known as a compact combined cylinder affords a more compact design. DE 10 2005 044 708 A1 (corresponding to U.S. Pat. No. 7,523,999 B2) discloses a brake cylinder of this type. In DE '708, the function of the parking brake cylinder is integrated directly into the service brake cylinder. Here, the spring force accumulator spring is no longer actuated via a separate spring force accumulator piston, but rather likewise via the piston of the service brake cylinder. In order to release the parking brake, the SBS piston is loaded for a short time period by way of a special actuation with compressed air.

As described in the preceding text, the parking brake is released as a rule with the aid of compressed air. In addition, however, it also has to be possible to release the parking brake by a manual operation in the case of a pressure loss.

To this end, in the case of conventional combined cylinders, the spring is pulled back with the aid of a threaded spindle (what is known as the "release spindle"). As a result, the function of the service brake cylinder is not impaired.

This cannot be realized in such a simple way in the case of the compact combined cylinder, since the SBS piston and the spring force accumulator spring are connected to one another. If the spring were pulled back by a threaded spindle which is accessible from the outside, the SBS piston would also be blocked and, as a consequence, the SBS cylinder would no longer function.

The object of the invention is to solve this problem with regard to combined cylinders.

According to the invention, a manually actuable release device is provided for releasing the spring force accumulator spring manually, which manually actuable release device makes it possible to cancel the spring force accumulator action in the case of a pressure loss, without impairing the SBS function. Furthermore, it is possible to reestablish the PBS action by a manual operation after the release operation.

The invention is also suitable, in particular, for compact combined cylinders which have a threaded spindle with a quick action thread that is not self-locking. The quick action thread primarily serves to make it possible for the spring force accumulator spring to be locked in what is known as the release position. To this end, the threaded spindle is arrested by way of a pneumatically actuated locking mechanism. When the parking brake is engaged, the locking mechanism is ventilated, as a result of which the threaded spindle can be rotated and the spring force accumulator spring can be relieved.

According to one particularly advantageous embodiment of the invention, the threaded spindle is also used to release the spring force accumulator spring manually. Here, the threaded spindle is set in rotation by an external introduction of force. Since it is a quick action thread which is not self-locking here, the spindle would rotate back again immediately and the spring force accumulator spring would therefore start to act again, for example, if the wrench is moved.

It is therefore necessary for the mechanism to be equipped, in particular, with a direction-dependent locking function or apparatus. According to the various embodiments, the locking apparatus also fulfills further requirements.

The locking apparatus is preferably to be designed such that it is switched off during normal operation of the brake cylinder. Otherwise, it would not be possible to engage the spring force accumulator brake, since the rotation of the threaded spindle in the relief direction of the spring force accumulator spring is suppressed by the direction-dependent locking action.

The locking apparatus is preferably to be designed such that it is possible to rotate the threaded spindle in both directions, in order for the PBS brake to be both released and engaged manually. Here, for safety reasons, the spring force accumulator spring should not be relieved in a single step and an unmeasured way, but rather in a manually measurable way (in an analogous way to the behavior in the case of a conventional spring force accumulator cylinder).

On account of the limited installation space, the locking apparatus is to have as compact and simple a construction as possible. Moreover, the components should be designed in such a way that inexpensive manufacturing is possible, for example by forming technology without the removal of material.

In principle, two different functional principles are contemplated: (a) first frictionally engaging systems based on a free wheel principle, and (b) second positively engaging systems based on a ratchet mechanism.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
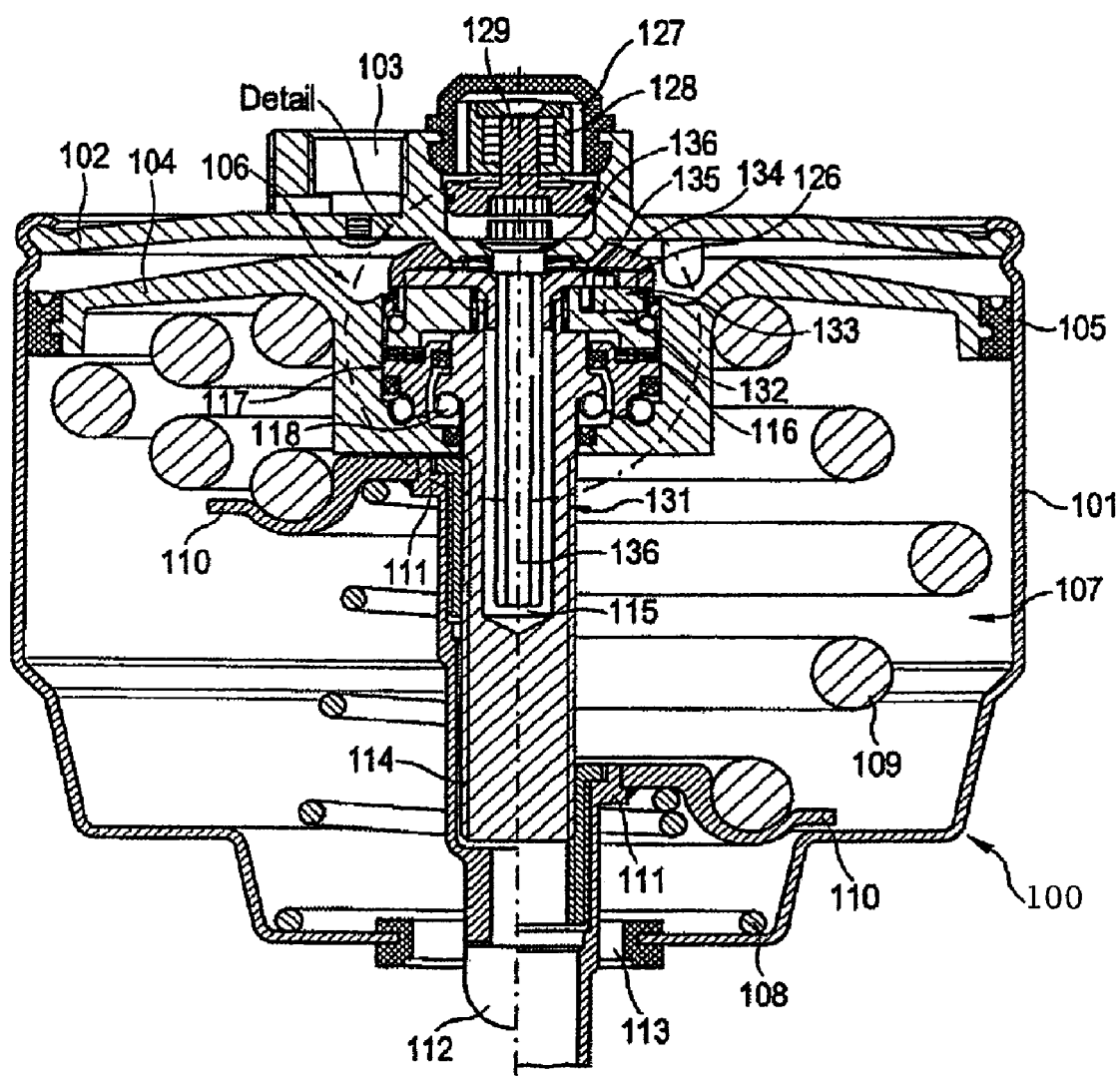
FIG. 1 is a cross-sectional view of a brake cylinder according to the invention in the release position (left side) and in the parking brake position (right side)

FIG. 1 shows a section through a compact brake cylinder 100 according to an embodiment of the invention, the spring force accumulator being shown in the released position in the left half of the drawing and the spring force accumulator being shown in the engaged position in the right half of the drawing.

Figure 2:
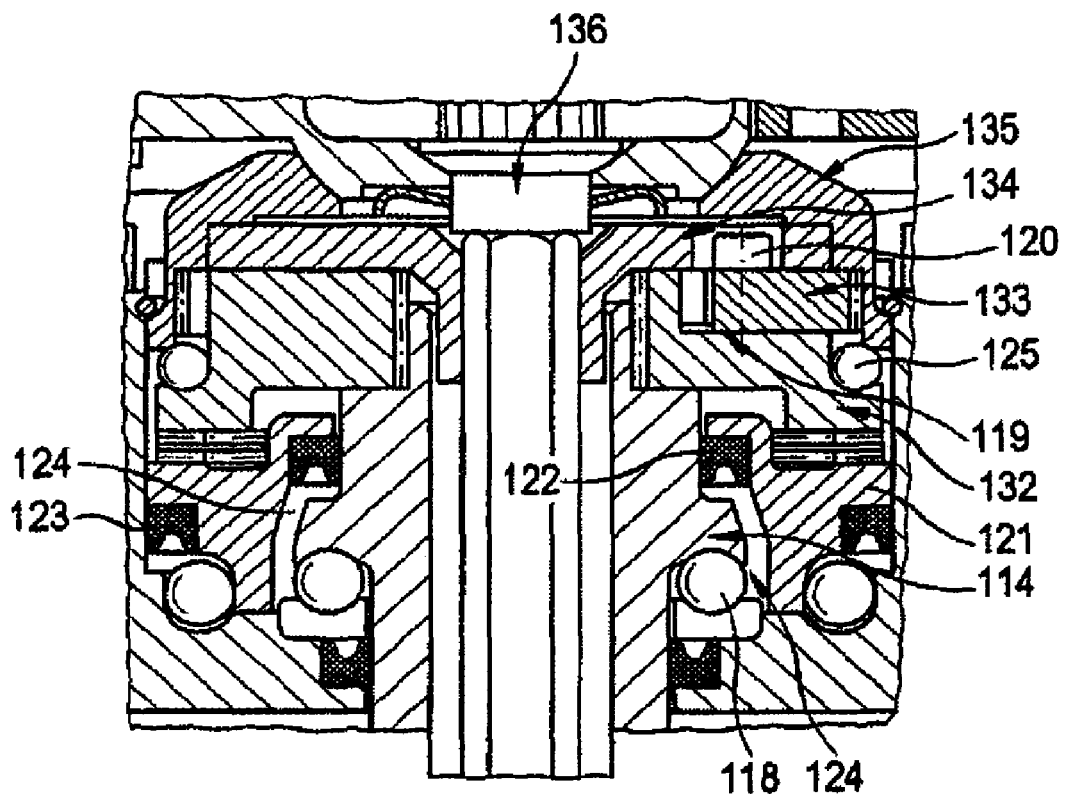
FIG. 2 shows a detailed view from FIG. 1.
Figure 3:
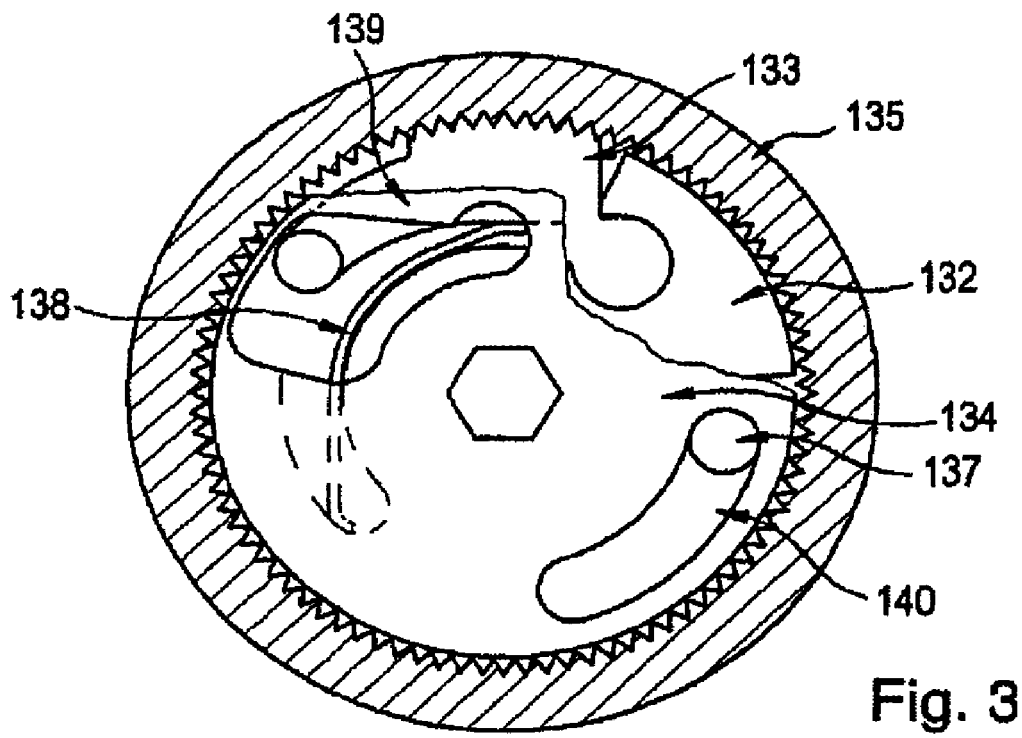
FIGS. 3 to 6 are partly cut-away illustrations of elements of a manually actuable release device of the compact brake cylinder from FIGS. 1 and 2 in different operating states.

The brake cylinder 100, which is shown in FIGS. 1 to 3, has a housing 101 which is cup-shaped and preferably substantially cylindrical. The housing 101 is closed at one of its ends by a cover 102, which is provided with at least one or more compressed air connections 103. A piston 104 having a piston sealing ring 105 is arranged in the cup-shaped housing 101, the diameter of the piston 104 together with the piston sealing ring 105 corresponding to the internal diameter of the housing 101. The piston 104 can be loaded through the compressed air connection 103 with compressed air, which can also flow out through the connection.

As FIG. 1 shows, the piston 104 is countersunk in its central region, with the result that a pressure space 106 is produced. A further space 107 is delimited by the piston 104, into which further space 107 a conical return spring 108 and a spring force accumulator spring 109 are inserted. The spring force accumulator spring 109 is placed between the piston 104 and a spring force accumulator piston 110, the diameter of which is smaller than the internal diameter of the housing.

The return spring 108 is placed between the side of the spring force accumulator piston 110 which faces away from the spring force accumulator and the inner end region of the housing 101 which faces away from the cover.

On its internal circumference, the spring force accumulator piston 110 rests on a collar 111 of a piston rod 112. The piston rod 112 penetrates an opening 113, which is formed in the housing 101 on the end of the housing 101 facing away from the cover 102. The piston rod 112 serves to actuate an application apparatus of a brake.

A pneumatically actuable locking mechanism 116 is accommodated in a central receiving space 117 of the piston 104 on that side of the piston 104 which faces the cover 102. The piston 104 receives the locking mechanism 116.

The piston rod 112 is of sleeve-shaped design and is provided with an internal thread, into which a threaded spindle 114 (provided with an external thread) engages. The threaded spindle 114 is not of a self-locking design. It is preferably coupled at one of its ends directly or via intermediate elements to the pneumatically actuable locking mechanism 116, which is configured here in the form of a pneumatically actuable clutch or brake. In the exemplary embodiment which is shown, the locking mechanism is configured as a positively engaging clutch 116.

Here, the clutch 116 is formed in an advantageous and compact way between a locking mechanism piston 121 and the axial faces of a bearing plate 132 (explained below) and is coupled to the threaded spindle 114 in a rotationally fixed manner.

On its internal and its external circumference, the locking mechanism piston 121 is sealed by way of piston ring seals 122, 123 with respect to the threaded spindle 114 and the receiving space 117.

The locking mechanism piston 121 can be loaded with compressed air via a pressure space 124 and via a compressed air line (in a manner which is not shown here), as a result of which the clutch 116 can be brought into engagement. The threaded spindle 114 is correspondingly prevented from rotating by loading the pressure space 124 below the locking mechanism piston 121 with compressed air, with the result that the PBS brake can be set out of operation. The threaded spindle 114 is supported on the piston 104 via rolling bodies 118.

In the position on the left of FIG. 1, the clutch 116 is closed and the pneumatically actuable locking apparatus is activated, with the result that the threaded spindle 114 is secured against rotating.

If the spring force accumulator piston 110 is then to be transferred into the parking brake position, which is shown in the illustration on the right of FIG. 1, the force which is guided into the clutch 116 from the locking mechanism piston 121 is reduced by a pressure drop in the space 124, with the result that the force which is applied by the spring force accumulator spring 109 brings about a situation where the threaded spindle 114 rotates, the spring force accumulator piston 110 being displaced with the piston rod 112 in the braking position.

The rotational speed can be regulated by the brake force of the clutch 116, with the result that the linear movement of the spring force accumulator piston 110 can also be controlled.

In order to release the braking position, the pressure space 106 is loaded with pressure in accordance with the preceding embodiment. Since the parking brake piston 121 is now pressureless, the threaded spindle 114 can be rotated and the spring force accumulator piston 110 is moved back into the initial position counter to the action of the spring force accumulator spring 109.

In the case of service brake operations, the clutch 116 remains in the braking position, with the result that the two pistons 104, 110 are moved jointly into the braking position, without changing their relative position with respect to one another. The action of the spring force accumulator spring 109 cannot be developed in this state. An analogous situation is valid for the release of the brake after service brake operations.

In the case of the compact combined cylinder 100, the function of the parking brake cylinder is integrated into the service brake cylinder. Here, the spring force accumulator spring 109 is no longer actuated via a separate spring force accumulator piston, but rather via the piston 104 of the service brake cylinder. In order to release the parking brake, the SBS piston is loaded for a short time period by means of a special actuation with compressed air.

As described in the preceding text, the parking brake or the parking brake section is released as a rule with the aid of compressed air. In addition, however, it is also possible according to the invention to release the parking brake section manually by way of a manually actuable release device in the case of a pressure loss. To this end, in the case of conventional combined cylinders, the spring is pulled back with the aid of a threaded spindle (of what is known as the release spindle). The function of the service brake cylinder is not impaired as a result.

In the case of the compact combined cylinder, this cannot be realized in such a simple way, since the SBS piston and the spring force accumulator spring are connected to one another. If the spring force accumulator spring 109 were pulled back by a threaded spindle which is accessible from the outside, the SBS piston would also be blocked and, as a consequence, there would also no longer be the function of the SBS cylinder.

A manually actuable release device is therefore advantageous for manually releasing the spring force accumulator spring, which manually actuable release device makes it possible to cancel the spring force accumulator action in the case of pressure loss, without impairing the SBS function. Furthermore, it is to be possible to reestablish the PBS action after the release operation by a manual operation. This is achieved by the fact that the manually actuable release device is assigned a likewise manually actuable locking apparatus. The locking apparatus, which is shown in the drawings and will be described in greater detail is based on a ratchet mechanism.

The ratchet mechanism has a bearing plate 132, which is coupled in a rotationally fixed manner to the threaded spindle 114 or is integrally configured with the latter. The threaded spindle 114 is supported on a cup disk 135 by way of rolling bodies 125 and can be rotated relative to the locking apparatus depending on the functional position of the latter which acts between these two elements 132, 135. The bearing plate 132 has a recess 119 for a locking pawl 133 and a peg 137, which serves for torque transmission. The locking pawl 133 is inserted rotatably into the bearing plate 132, is connected to the disk cam 134 by an integrally formed pin 120 and is pressed radially to the outside by a leaf spring 138.

Furthermore, the ratchet mechanism includes a disk cam 134 with a control contour 139, an arcuate slot 140 and a centrally arranged hexagonal aperture. The control contour 139 serves for switching the locking pawl 133 on and off. In contrast, the arcuate slot 140 serves, above a defined angular travel, to transmit the torque to the bearing plate 132. The hexagon socket serves to introduce the torque into the disk cam 134. A profiled actuating mandrel 136 serves to introduce the manually applied torque. Furthermore, it serves to switch the mechanism on and off. The actuating mandrel 136 is mounted rotatably and pivotably in the housing 101 of the brake cylinder.

Furthermore, the ratchet mechanism includes the cup disk 135 having an internal toothing system, which is in engagement with the locking pawl 133 having a corresponding toothing system in the case of the manual release operation. The cup disk 135 is supported on the piston 104 and cannot be rotated relative to the latter. Since it is a positively engaging ratchet mechanism, reliable and slip-free locking of the spring force accumulator spring is ensured.

The function of this arrangement is as follows. In the case of the manual release of the spring force accumulator spring 109, the threaded spindle 114 has to be turned back with the aid of a wrench. Here, the torque is transmitted via the actuating mandrel 136 into the disk cam 134. As a result of the rotation of the disk cam 134 relative to the bearing plate 132, the locking pawl 133 is released by the control contour 139 for engagement into the toothing system of the cup disk 135. Here, the locking pawl 133 is pressed elastically by the leaf spring 138 against the internal toothing system of the rotationally fixed cup disk 135. At the same time, after rotating past the control angle, the torque is transmitted via the arcuate slot 140 and a corresponding peg 137 in the bearing plate 132, from the disk cam 134 into the bearing plate 132 and from there into the threaded spindle 114.

Since, on account of the direction-dependent locking action, the locking pawl 133 prevents automatic turning back of the threaded spindle 114, the wrench can be turned without the threaded spindle 114 being turned back. This operation can be repeated until the spring force accumulator spring has reached the release position for the parking brake.

If the spring force accumulator spring is to be moved from the position "spring force accumulator released" manually into the position "spring force accumulator engaged", a rotational movement in the locking direction of the ratchet mechanism has to be carried out by way of the wrench. Here, first of all, the disk cam 134 is rotated relative to the bearing plate 132 until the locking pawl 133 is pulled out of the internal toothing system of the cup disk 135 by the control contour 139. As soon as this state is reached, the threaded spindle 114 can be rotated.

Figure 5:
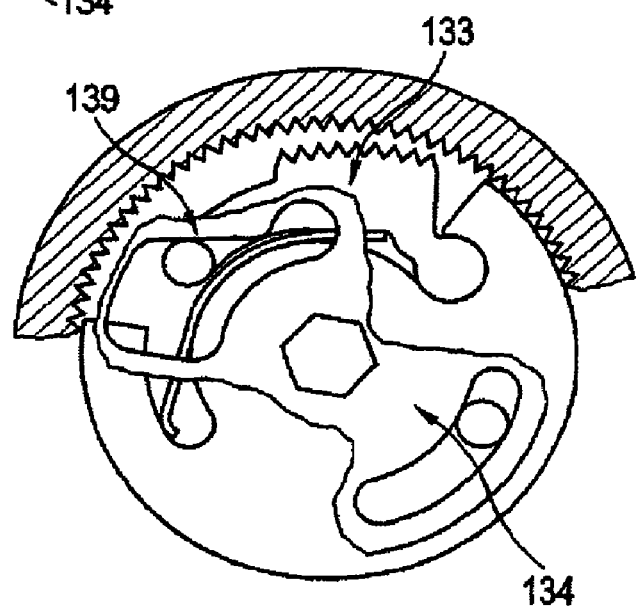

FIG. 5 shows a manual application of this type of the spring force accumulator brake. In this figure, the disk cam 134 is rotated to the left, as a result of which the locking pawl 133 is pulled out of the toothing system via the contour 139. As a result, the bearing plate 132 can be rotated as far as the next latching of the locking pawl 133.

Since the threaded spindle 114 moves more quickly than the disk cam 134 which is guided by the wrench, a relative movement occurs between the bearing plate 132 and the disk cam 134 and, as a consequence, the locking pawl 133 latches again in the internal toothing system of the rotationally fixed cup disk 135. This ensures that the threaded spindle 114 is rotated only so far and as quickly as is predefined by the rotational movement of the wrench.

To this end, it is necessary to rotate the actuating mandrel 136 with the aid of a wrench in the direction of "engage spring force accumulator brake" until a further rotation is no longer possible. This achieves a situation where the disk cam 134 is rotated relative to the bearing plate 132 and the switching pin of the locking pawl 133 is moved into a latching position on the control contour 139.

Figure 6:
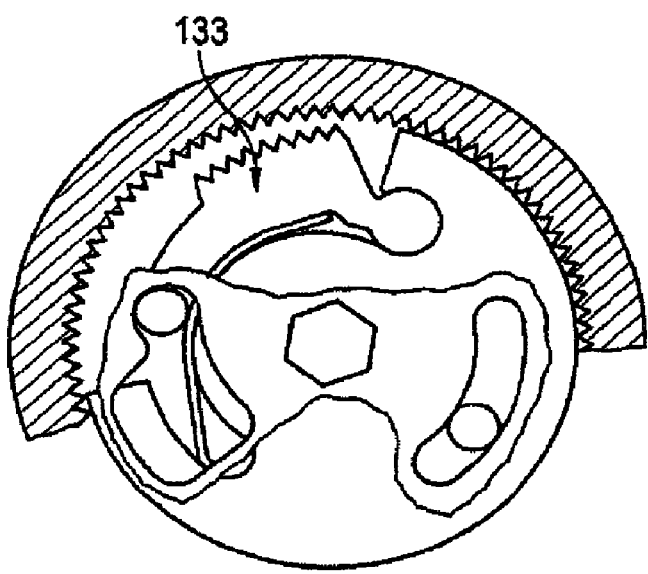

FIG. 6 shows the manual release device in its deactivated position. The locking pawl 133 remains in its rest position.

Figure 4:
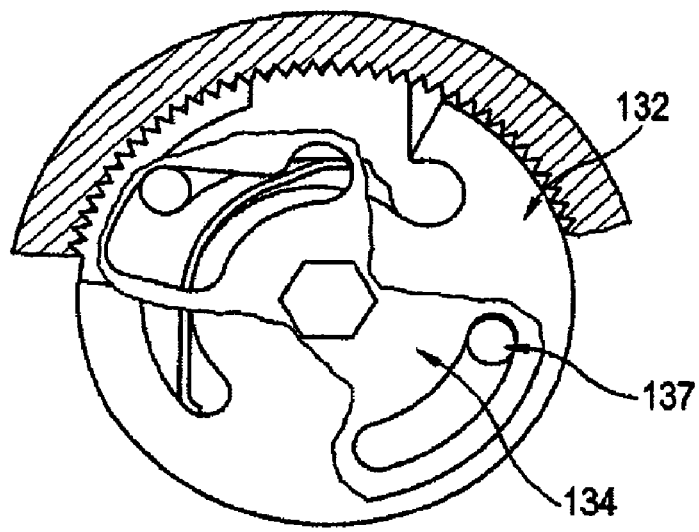

FIG. 4 shows the locking position of the free wheel. The bearing plate 132 is rotated to the right by the disk cam 134 via the pin 137. The bearing plate 132 cannot rotate automatically to the left in this position.

As described in the preceding text, during the manual release operation of the spring force accumulator brake, the threaded spindle 114 is rotated with the aid of what is known as the actuating mandrel 136 and the ratchet mechanism 126 for pulling back the accumulator spring 109 by way of a wrench.

During the manual release operation, the actuating mandrel 136 is in contact with the manual rotating apparatus 127 for attaching an actuating tool, in particular a wrench. The rotating apparatus 127 is designed in such a way that, for example while being turned back, that is to say, releasing of the spring force accumulator, an outer sleeve 128 follows a travel (stroke) in the axial direction as a result of a special shape, until an introduction of torque is possible.

This axial stroke results in a graduation on the end side between the outer sleeve 128 and an inner pin 129. On account of this clear contour change, the manual release state of the spring force accumulator brake can be visually detected or sensed.

A further exemplary embodiment of the invention will be described in the following text. A further brake cylinder is disclosed with a release device for manually releasing the spring force accumulator spring, which makes it possible to cancel the spring force accumulator effect in the case of pressure loss without impairment of the SBS function. Here, the PBS effect can be reestablished by a manual operation even after the release operation.

Figure 7:
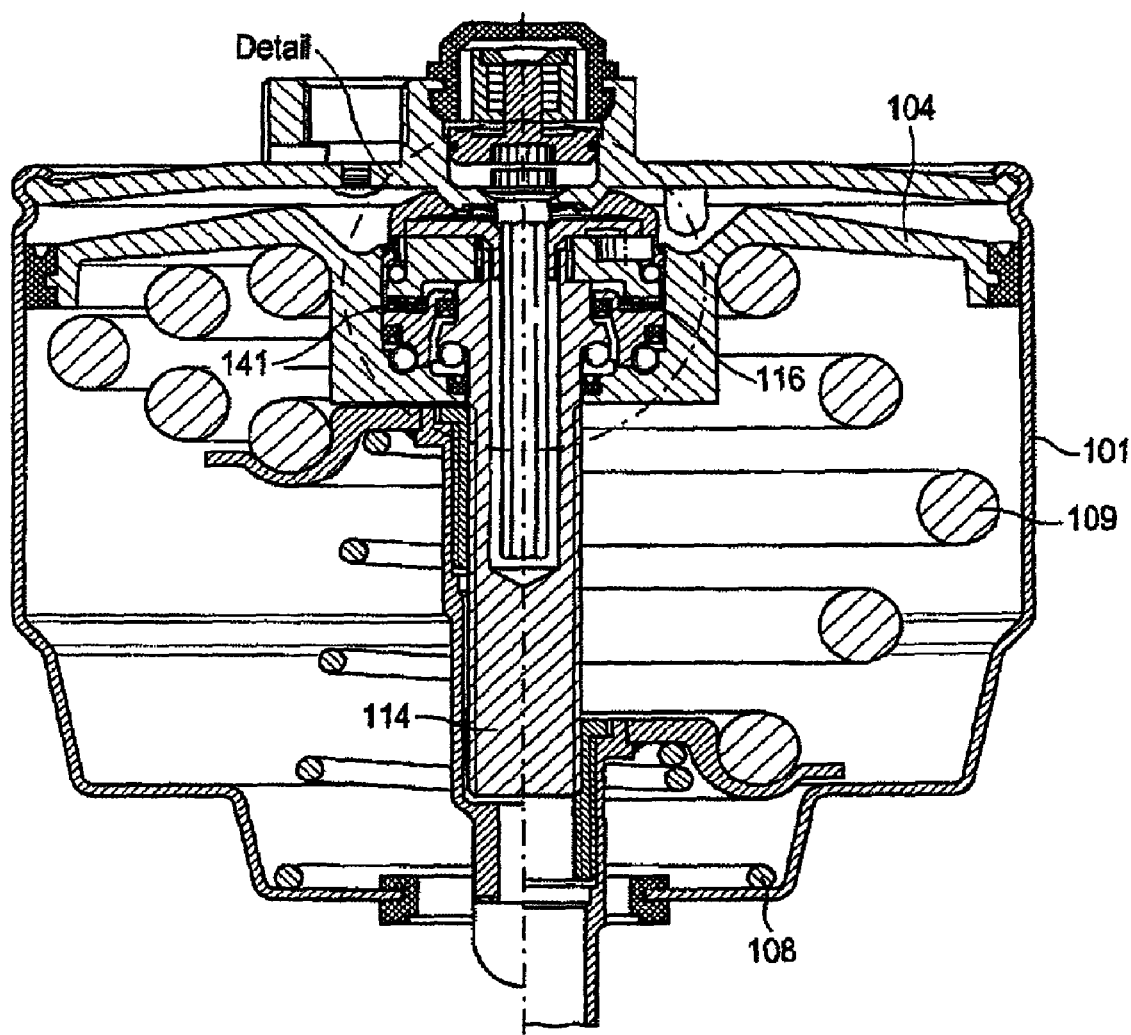
FIG. 7 is a cross-sectional view of a further brake cylinder according to the invention showing release and parking brake positions.
Figure 8:
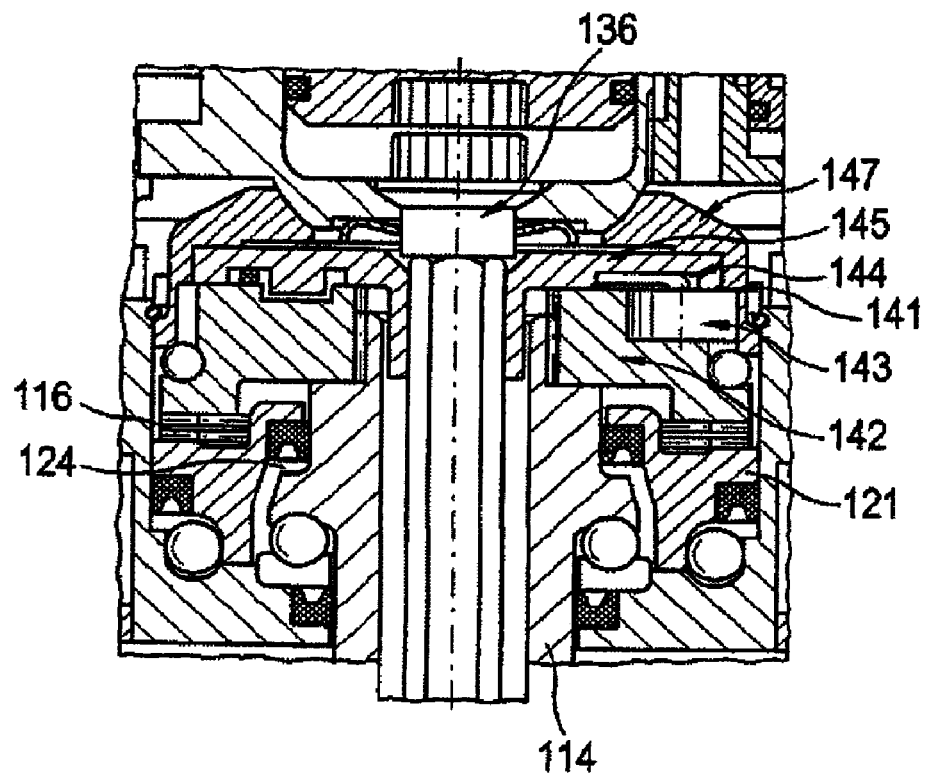
FIG. 8 is a detailed view from FIG. 7.
Figure 9:
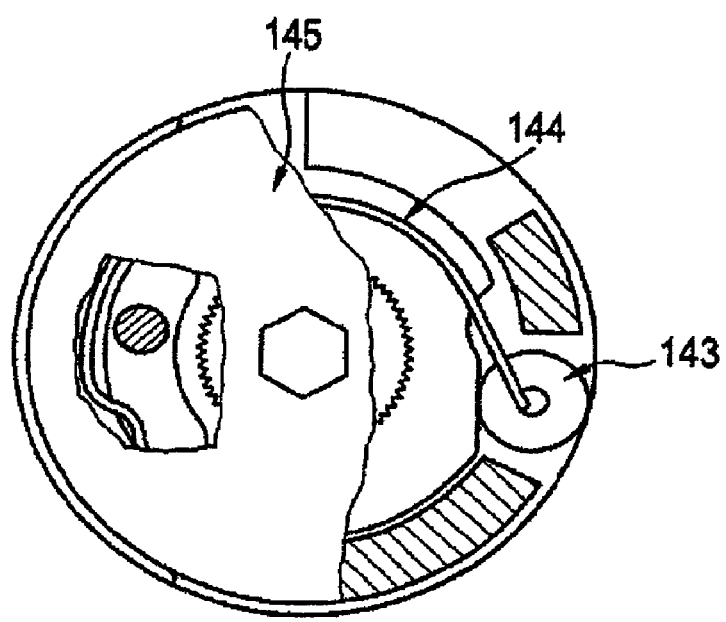
FIGS. 9 to 12 are partly cut-away illustrations of elements of a manually actuable release device of the compact brake cylinder from FIGS. 7 and 8 in different operating states.

FIG. 7 shows a further compact combined brake cylinder with a threaded spindle 114 with a quick action thread (not self-locking). The quick action thread again serves to lock the spring force accumulator spring in what is known as the release position. To this end, the threaded spindle is arrested by means of the pneumatically actuated locking apparatus, the clutch 116 or a brake. During engagement of the parking brake, the locking mechanism is ventilated (cannot be seen here), as a result of which the threaded spindle 114 can be rotated and the spring force accumulator spring 109 can be relieved.

In the further proposed solution, this threaded spindle 114 also serves to manually release the spring force accumulator spring 109. Here, the threaded spindle 114 is set in rotation by an external introduction of force. Since this is a quick action thread which is not self-locking, the spindle would turn back again immediately, for example when the wrench is turned, and the spring force accumulator spring would therefore start to act again. It is therefore required that the mechanism is equipped with a direction-dependent locking function. This locking apparatus will also meet further requirements.

The release device which is shown in the drawings and is described in greater detail is based on a non-positive freewheeling system 141. As described in the following text, the release device has the following elements: a locking disk 142, a locking cylinder 143, a shaped spring 144, a disk 145 and, preferably, the actuating mandrel 136 and a rotationally fixed cup disk 147.

The locking disk 142 is coupled to the threaded spindle 114 in a rotationally fixed manner and has a cutout for receiving the locking cylinder 143. The locking cylinder 143 is prestressed by means of a shaped spring 144. The shaped spring 144 is suspended between the locking disk 142 and the locking cylinder 143. The disk 145 axially adjoining the locking disk 142 serves to switch the freewheeling function on and off and to transmit the torque to the locking disk 142. The profiled actuating mandrel 136 in turn serves to introduce the manually applied torque. Furthermore, it serves to switch the release device on and off.

The actuating mandrel 136 is mounted rotatably and pivotably in the housing of the brake cylinder. The locking disk 142 and the locking cylinder 143 are supported frictionally on the rotationally fixed cup disk 147 or on its cylindrical inner contour.

Figure 10:
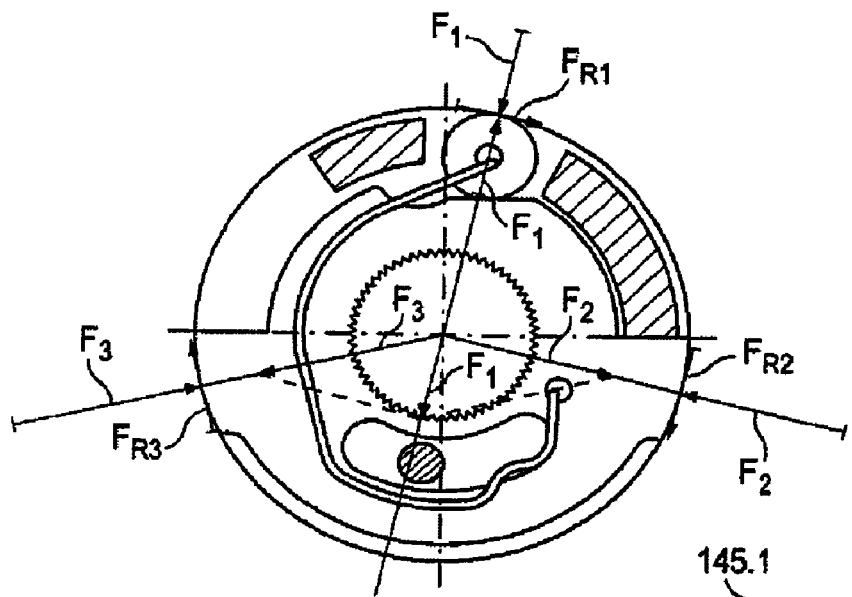

The locking disk 142 is designed in such a way that an increase in the pressing force on the two supporting segments is achieved by a defined angular position (FIG. 10). As a result, a relatively high frictional force can be achieved with a relatively low pressing force on the clamping cylinder. As a result of the clear reduction in the loading of the clamping cylinder, the wear resistance of the mechanism can be increased considerably.

Figure 11:
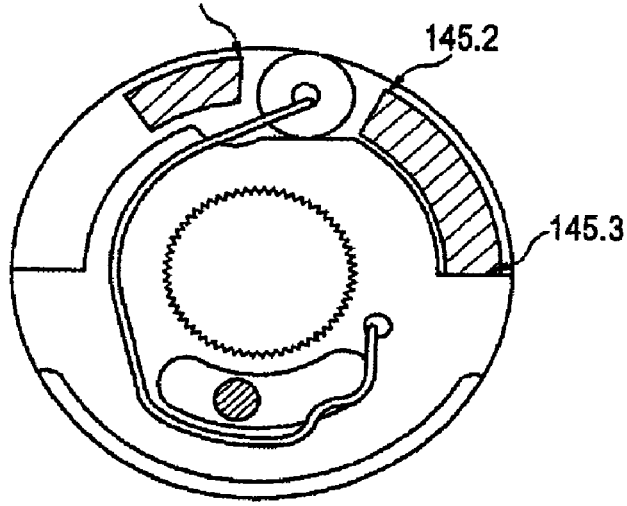

The function of this arrangement is as follows:

Release of the Spring Force Accumulator Brake (FIG. 11):

During the manual release of the spring force accumulator spring, the threaded spindle 114 has to be turned back with the aid of a wrench. Here, the torque is transmitted via the actuating mandrel 136 into the disk 4. By the rotation of the disk 145 relative to the locking disk 142, the locking cylinder 143 is pushed by the stop shoulder 145.1 of the disk 145 out of the rest position onto the clamping contour 145.2. Here, the locking cylinder 143 is pressed elastically by the shaped spring 144 against the cylindrical inner contour 147.1 of the rotationally fixed cup disk 147. At the same time, the stop shoulder 145.3 of the disk 145 comes into contact with the corresponding mating contour of the locking disk 142. As a result, the torque is transmitted from the disk 145 to the locking disk 142 and from there to the threaded spindle 114. Since the locking cylinder 143 prevents the threaded spindle 141 from turning back automatically, on account of the direction-dependent, frictional locking action, the wrench can be turned without the threaded spindle 141 being turned back. This operation can be repeated until the spring force accumulator spring has reached the release position for the parking brake.

Manual Engagement of the Spring Force Accumulator Brake

If the spring force accumulator spring is to be moved manually from the position "spring force accumulator released" into the position "spring force accumulator engaged", a rotational movement in the locking direction of the freewheeling mechanism has to be carried out by way of the wrench.

Here, the disk 145 is rotated relative to the locking disk 142 and is pressed out of the clamping position with the stop shoulder 145.2 of the clamping cylinders 143. As a result, the force flow is canceled between the clamping disk 142 and the rotationally fixed cup disk 147, and rotation of the threaded spindle 114 is possible. Since the threaded spindle 114 moves more quickly than the disk 145 which is guided by the wrench, a relative movement occurs between the locking disk 142 and the disk 145 and, as a consequence, the locking cylinder 143 engages again into the internal contour of the rotationally fixed cup disk 147. This ensures that the threaded spindle 114 is rotated only so far and as quickly as is predefined by the rotational movement of the wrench.

Figure 12:
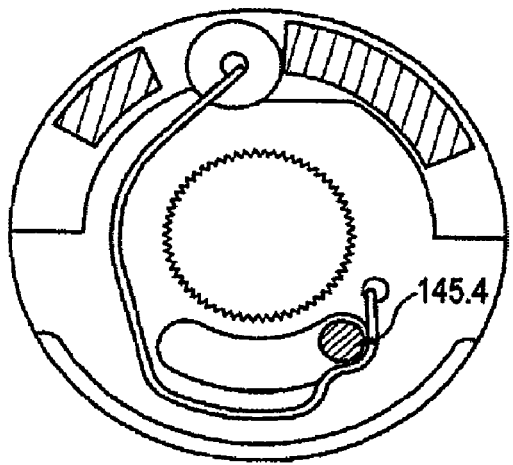

Deactivation and Locking of the Manual Release Device (FIG. 12)

For this purpose, it is necessary to rotate the actuating mandrel 136 with the aid of a wrench in the direction "engage spring force accumulator brake" until a further rotation is no longer possible. This achieves a situation where the disk 145 is rotated relative to the locking disk 142, and both the clamping cylinder 143 is moved into a latching position on the clamping disk 142 and the locking peg 145.4 of the disk 145 is moved into a latching position of the shaped spring 144.

Table of Reference Numerals

| Name | Number |
|---|---|
| Compact brake cylinder | 100 |
| Housing | 101 |
| Cover | 102 |
| Compressed air connections | 103 |
| Piston | 104 |
| Circumferential sealing ring | 105 |
| Pressure space | 106 |
| Space | 107 |
| Return spring | 108 |
| Spring force accumulator spring | 109 |
| Spring force accumulator piston | 110 |
| Collar | 111 |
| Piston rod | 112 |
| Opening | 113 |
| Threaded spindle | 114 |
| Locking mechanism | 116 |
| Receiving space | 117 |
| Rolling bodies | 118 |
| Recess | 119 |
| Pin | 120 |
| Locking mechanism piston | 121 |
| Piston seals | 122, 123 |
| Pressure space | 124 |
| Rolling body | 125 |
| Ratchet mechanism | 126 |
| Rotating apparatus | 127 |
| Sleeve | 128 |
| Pin | 129 |
| Bearing plate | 132 |
| Locking pawl | 133 |
| Disk cam | 134 |
| Cup disk | 135 |
| Actuating mandrel | 136 |
| Peg | 137 |
| Leaf spring | 138 |
| Control contour | 139 |
| Slot | 140 |
| Freewheeling system | 141 |
| Locking disk | 142 |
| Locking cylinder | 143 |
| Shaped spring | 144 |
| Disk | 145 |
| Stop shoulder | 145.1 |
| Clamping contour | 145.2 |
| Stop shoulder | 145.3 |
| Locking peg | 145.4 |
| Cup disk | 147 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake cylinder for a pneumatically actuated vehicle brake, comprising:
a spring force accumulator brake section for carrying out parking brake operations via a spring force accumulator spring, and a service brake section for carrying out service brake operations which are actuated by compressed air, the spring force accumulator brake section and the service brake section being combined in a housing to form one structural unit;
a first piston dividing the housing into two spaces, of which one of the two spaces serves as a pressure space for applying and releasing the service brake section, the spring force accumulator spring of the spring force accumulator section being arranged in the other space of the two spaces on an opposite side of the piston;
a second piston in the other space of the two spaces, wherein the spring force accumulator spring is located between the two pistons with a first spring end biased against the first piston and a second spring end biased against the second piston;
a pneumatically actuable locking mechanism, the second piston being lockable with respect to the first piston by the locking mechanism and is releaseable by a release action of the locking mechanism, the second piston being connected directly or via further elements to a piston rod for actuating the vehicle brake; and
wherein, after release of the locking mechanism, the spring force accumulator spring acts between the two pistons and displaces them relative to one another in the case of a parking brake operation; and
a manually actuable release device for manually releasing the spring force accumulator brake section without impairing the service brake section functionality.

2. The brake cylinder as claimed in claim 1, wherein the spring force accumulator piston, which is loaded by the spring force accumulator spring, is in engagement with a threaded spindle operatively connected to a brake or clutch forming the pneumatically actuable locking mechanism;
wherein the threaded spindle is secured against rotation in a release state of the brake cylinder; and
wherein the threaded spindle is capable of rotation as a result of reduction or cancelation of the engagement of the brake or clutch, with the result that the spring force accumulator piston is movable in a longitudinal direction of the threaded spindle upon relieving the spring force accumulator spring.

3. The brake cylinder as claimed in claim 1, wherein the manually actuable release device has a direction-dependent, manually actuable locking apparatus for a threaded spindle arranged to engage the spring force accumulator piston.

4. The brake cylinder as claimed in claim 2, wherein the manually actuable release device has a direction-dependent, manually actuable locking apparatus for the threaded spindle.

5. The brake cylinder as claimed in claim 4, wherein the locking apparatus is designed as a positively engaging system.

6. The brake cylinder as claimed in claim 5, wherein the locking mechanism is designed as a positively engaging system which has a ratchet mechanism.

7. The brake cylinder as claimed in claim 2, wherein the threaded spindle is not self-locking, and further wherein the frictional force of the clutch or brake is regulatable via a locking mechanism piston, which can be loaded with compressed air.

8. The brake cylinder as claimed in claim 6, wherein the ratchet mechanism has a disk having an internal toothing system which is in engagement with a movable locking pawl having a corresponding toothing system in the case of the manual release operation.

9. The brake cylinder as claimed in claim 3, wherein the manually actuable locking apparatus is designed such that it is switched off during normal operation of the brake cylinder.

10. The brake cylinder as claimed in claim 4, wherein the manually actuable locking apparatus is designed such that the threaded spindle is rotatable in both directions.

11. The brake cylinder as claimed in claim 6, wherein the ratchet mechanism has a bearing plate which is coupled in a rotationally fixed manner to the threaded spindle or is integrally configured with the threaded spindle.

12. The brake cylinder as claimed in claim 11, wherein the bearing plate has a recess for the locking pawl and a pin for torque transmission.

13. The brake cylinder as claimed in claim 12, wherein the locking pawl is inserted rotatably into the bearing plate, is connected to a disk cam by an integrally formed pin, and is pressed radially to the outside by a leaf spring.

14. The brake cylinder as claimed in claim 6, wherein the ratchet mechanism has a disk cam with a control contour, an arcuate slot and a centrally arranged hexagonal aperture.

15. The brake cylinder as claimed in claim 3, wherein a profiled actuating mandrel is provided which serves to introduce the manually applied torque and which serves to switch the release device on and off.

16. The brake cylinder as claimed in claim 15, wherein the actuating mandrel is mounted rotatably and pivotably in the housing of the brake cylinder.

* * * * *